United States Patent
Zhang et al.

(10) Patent No.: US 12,067,753 B2
(45) Date of Patent: Aug. 20, 2024

(54) 2D UV ATLAS SAMPLING BASED METHODS FOR DYNAMIC MESH COMPRESSION

(71) Applicant: TENCENT AMERICA LLC, Palo Alto, CA (US)

(72) Inventors: Xiang Zhang, Sunnyvale, CA (US); Chao Huang, Palo Alto, CA (US); Xiaozhong Xu, State College, PA (US); Jun Tian, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/887,918

(22) Filed: Aug. 15, 2022

(65) Prior Publication Data
US 2023/0048897 A1 Feb. 16, 2023

Related U.S. Application Data (60) Provisional application No. 63/233,475, filed on Aug. 16, 2021.

(51) Int. Cl.
| | |
|---|---|
| *H04N 19/132* | (2014.01) |
| *G06T 9/00* | (2006.01) |
| *H04N 19/119* | (2014.01) |
| *H04N 19/14* | (2014.01) |
| *H04N 19/70* | (2014.01) |

(52) U.S. Cl.
CPC ........... *G06T 9/001* (2013.01); *H04N 19/119* (2014.11); *H04N 19/132* (2014.11); *H04N 19/14* (2014.11); *H04N 19/70* (2014.11)

(58) Field of Classification Search
CPC .... G06T 9/001; H04N 19/119; H04N 19/132; H04N 19/14; H04N 19/70
See application file for complete search history.

(56) References Cited

U.S. PATENT DOCUMENTS

| | | | |
|---|---|---|---|
| 9,665,776 B2 * | 5/2017 | Kleihorst | ......... G08B 13/19641 |
| 2006/0044313 A1 | 3/2006 | Lake et al. | |
| 2020/0045292 A1 | 2/2020 | Boyce | |
| 2020/0217937 A1 | 7/2020 | Mammou et al. | |

(Continued)

OTHER PUBLICATIONS

"Draft CfP for Dynamic Mesh Coding" ISO/IEC JTC 1/SC 29/WG 7, https://isotc.iso.org/livelink/livelink/open/itc1sc29wg7, Jul. 9, 2021, pp. 1-21.

(Continued)

*Primary Examiner* — Jae N Noh
(74) *Attorney, Agent, or Firm* — Sughrue Mion, PLLC (57) ABSTRACT

Method, apparatus, and system for sampling-based dynamic mesh compression are provided. The process may include determining one or more sample positions associated with an input mesh based on one or more sampling rates, and an occupancy status associated respectively with each of the one or more sample positions indicating whether each of the one or more sample positions is within boundaries of one or more polygons defined by the input mesh is determined. The process may include generating a sample-based occupancy map based on the occupancy status associated respectively with each of the one or more sample positions.

20 Claims, 9 Drawing Sheets

(56) References Cited

U.S. PATENT DOCUMENTS

2020/0314435 A1 10/2020 Tourapis et al.
2023/0063575 A1* 3/2023 Huang .................... G06T 9/20

OTHER PUBLICATIONS

International Search Report dated Nov. 3, 2022 issued by the International Searching Authority in Application No. PCT/US 22/40401.
Written Opinion dated Nov. 3, 2022 issued by the International Searching Authority in Application No. PCT/US 22/40401.
Extended European Search Report issued Dec. 20, 2023 in European Application No. 22859015.4.
Xiang Zhang, et al., "[V-CG] Tencent's Dynamic Mesh Coding CfP response", International Organisation for Standardisation Organisation Internationale De Normalisation ISO/IEC JTC 1/SC 29/WG 7 Coding of Moving Pictures and Audio, ISO/IEC JTC 1/SC 29/WG 7, m59295, Apr. 2022, Online, pp. 1-16 (16 pages total).
Korean Office Action issued May 5, 2020 in Application No. 10-2023-7009312.

* cited by examiner

705 → Determine Sample Positions Based on Input Mesh Maps

710 → Determine Occupancy Status Associated with Each Sample Position Based on Polygon Boundary

715 → Generate Sample Based Occupancy Map Based on Occupancy Status

720 → Determine 3D Geometry Coordinates Associated with Each Sample Position Based on Polygon Vertices

725 → Generate Sample Based Geometry Map Based on 3D Geometry Coordinates

730 → Determine Attribute Values Associated with Each Sample Position Based on Polygon Vertices

735 → Generate Sample Based Attribute Map Based on Attribute Values

FIG. 9

2D UV ATLAS SAMPLING BASED METHODS FOR DYNAMIC MESH COMPRESSION

CROSS-REFERENCE TO RELATED APPLICATION

This application claims priority from U.S. Provisional Application No. 63/233,475, filed on Aug. 16, 2021, the disclosure of which is incorporated herein by reference in its entirety.

FIELD

This disclosure is directed to a set of advanced video coding technologies. More specifically, the present disclosure is directed to video based dynamic mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to embodiments, a method for sampling-based dynamic mesh compression may be provided. The method may be executed by at least one processor, and may include determining one or more sample positions associated with an input mesh based on one or more sampling rate; determining an occupancy status associated respectively with each of the one or more sample positions, wherein the occupancy status indicates whether each of the one or more sample positions are within boundaries of one or more polygons defined by the input mesh; generating a sample-based occupancy map based on the occupancy status associated respectively with each of the one or more sample positions; and compressing the sample-based occupancy map using a video codec into a plurality of single-channel or multiple-channel images.

According to embodiments, an apparatus for sampling-based dynamic mesh compression may be provided. The device may include at least one memory configured to store program code; and at least one processor configured to read the program code and operate as instructed by the program code. The program code may include first determining code configured to cause the at least one processor to determine one or more sample positions associated with an input mesh based on one or more sampling rate; second determining code configured to cause the at least one processor to determine an occupancy status associated respectively with each of the one or more sample positions, wherein the occupancy status indicates whether each of the one or more sample positions are within boundaries of one or more polygons defined by the input mesh; first generating code configured to cause the at least one processor to generate a sample-based occupancy map based on the occupancy status associated respectively with each of the one or more sample positions; and compressing code configured to cause the at least one processor to compress the sample-based occupancy map using a video codec into a plurality of single-channel or multiple-channel images.

According to embodiments, a non-transitory computer-readable medium stores computer instructions may be provided. The instructions may include one or more instructions that, when executed by one or more processors of a device for sampling-based dynamic mesh compression, cause the one or more processors to determine one or more sample positions associated with an input mesh based on one or more sampling rate; determine an occupancy status associated respectively with each of the one or more sample positions, wherein the occupancy status indicates whether each of the one or more sample positions are within boundaries of one or more polygons defined by the input mesh; generate a sample-based occupancy map based on the occupancy status associated respectively with each of the one or more sample positions; and compress the sample-based occupancy map using a video codec into a plurality of single-channel or multiple-channel images.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A mesh may be composed of several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. Existing standards do not take into account time varying attribute maps and connectivity information. Existing standards also do not support volumetric acquisition techniques that generate a constant connectivity dynamic mesh, especially under real-time conditions.

Therefore, new mesh compression standard to directly handle dynamic meshes with time varying connectivity information and optionally time varying attribute maps is needed. Embodiments of the present disclosure enable efficient compression technologies to store and transmit such dynamic meshes. Embodiments of the present disclosure enable lossy and/or lossless compression for various applications, such as real-time communications, storage, free viewpoint video, AR and VR.

According to an aspect of the present disclosure, methods, systems, and non-transitory storage mediums for dynamic mesh compression are provided. Embodiments of the present disclosure may also be applied to static meshes, where only one frame of the mesh or the mesh content does not change over time.

Figure 1:
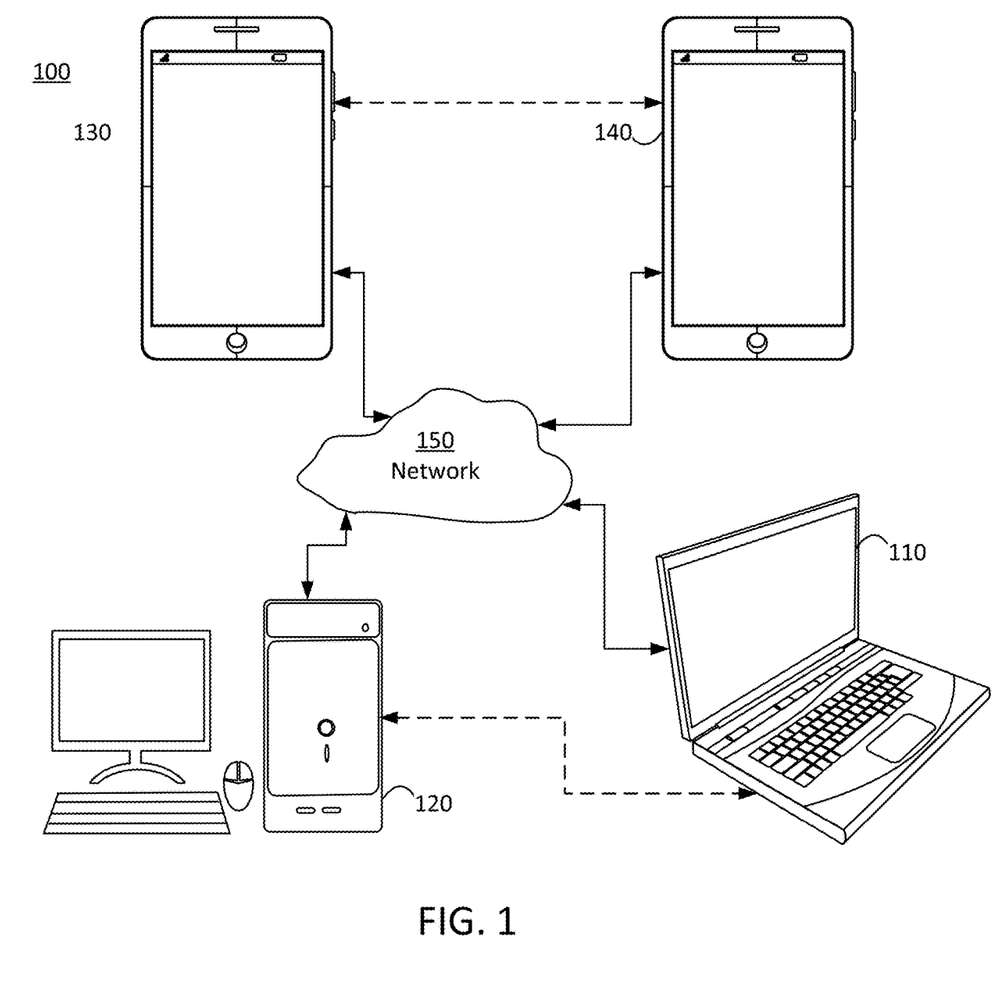
FIG. 1 is a schematic illustration of a simplified block diagram of a communication system, in accordance with embodiments of the present disclosure.
Figure 2:
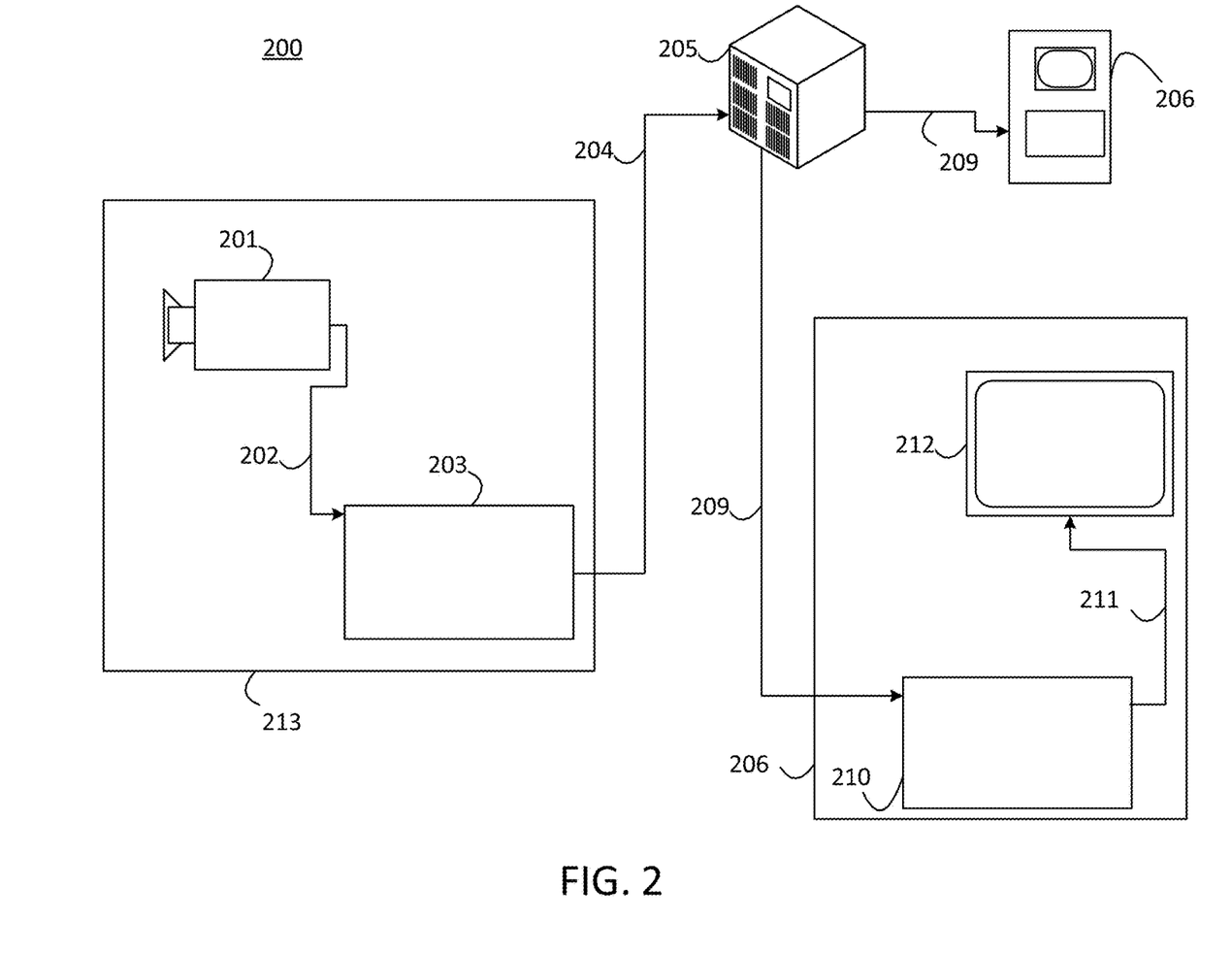
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3:
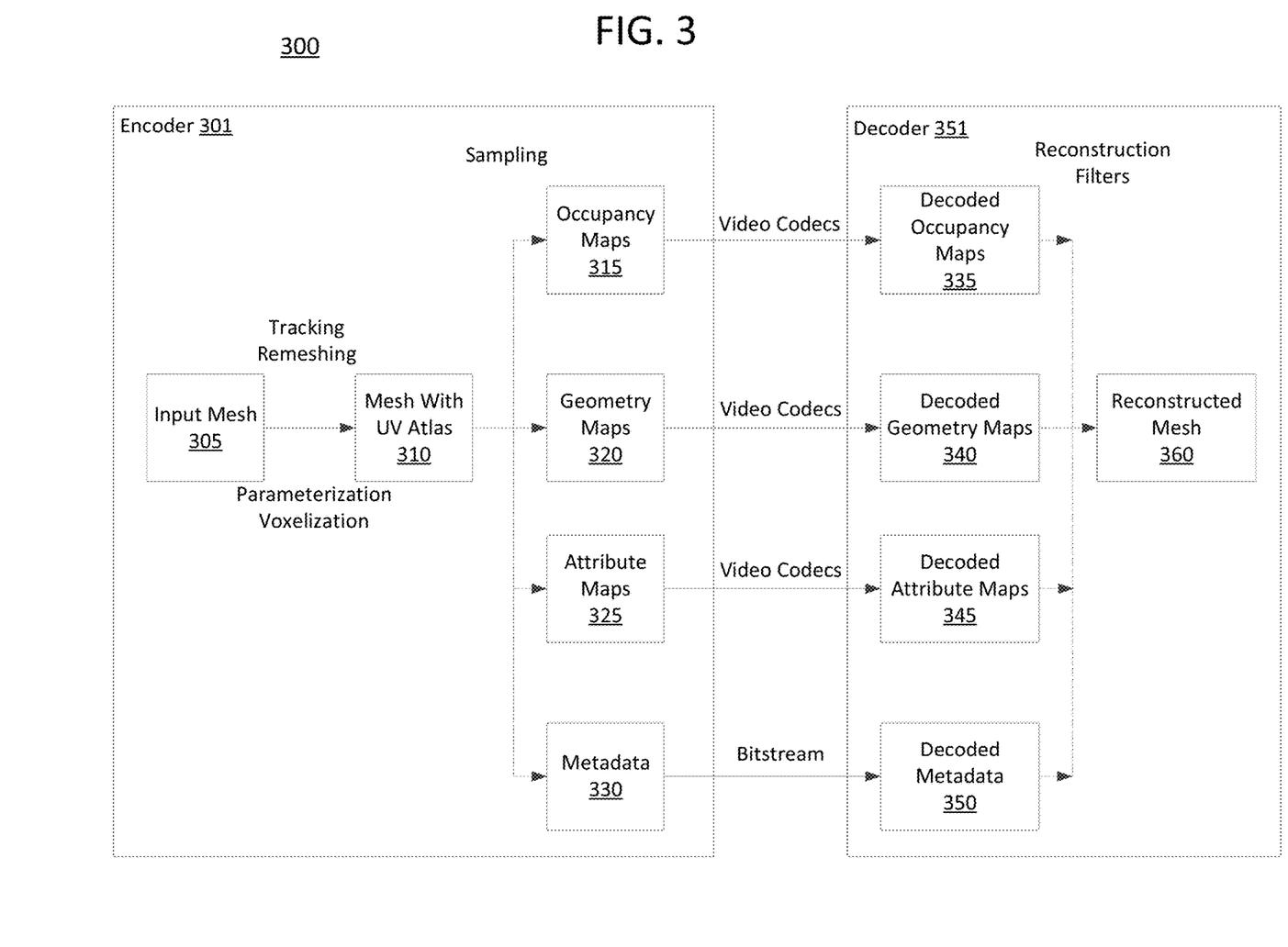
FIG. 3 is a schematic illustration of a simplified block diagram of a video encoder and decoder, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 315 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

The input meshes with 2D UV atlases may have vertices, where each vertex of the mesh may have an associated UV coordinates on the 2D atlas. The occupancy, geometry, and attribute maps may be generated by sampling one or more points/positions on the UV atlas. Each sample position, if it is inside a polygon defined by the mesh vertices, may be occupied or unoccupied. For each occupied sample, one can calculate its corresponding 3D geometry coordinates and attributes by interpolating from the associated polygon vertices.

According to an aspect of the present disclosure, the sampling rate may be consistent over the whole 2D atlas. In some embodiments, the sampling rate for u and v axes may be different, making anisotropic remeshing possible. In some embodiments, the whole 2D atlas may be divided into multiple regions, such as slices or tiles, and each such region may have a different sampling rate.

According to an aspect of the present disclosure, the sampling rate for each region (or the entire 2D atlas) may be signaled in a high-level syntax, including but not limited to sequence header, frame header, slice header, etc. In some embodiments, sampling rate for each region (or the entire 2D atlas) may be chosen from a pre-established set of rates that have been assumed by both the encoder and decoder. Because the pre-established set of rates that are known by both the encoder and decoder, signaling of one particular sampling rate would require only signaling the index in the pre-established rate set. An example of such a pre-established set may be every 2 pixels, every 4 pixels, every 8 pixels, etc. In some embodiments, the sampling rate for each region (or the entire 2D atlas) of a mesh frame may be predicted from a pre-established rate set, from a previously used sampling rate in other already coded regions of the same frame, or from a previously used sampling rate in other already coded mesh frames.

In some embodiments, the sampling rate for each region (or the entire 2D atlas) may be based on some characteristic of each region (or the entire 2D atlas). As an example, the sample rate can be based on activity—for a rich-textured region (or the entire 2D atlas), or a region (or the entire 2D atlas) with high activity, the sample rate could be set higher. As another example, for a smooth region (or the entire 2D atlas), or a region (or the entire 2D atlas with low activity, the sample rate could be set lower.

In some embodiments, the sampling rate for each region (or the entire 2D atlas) of a mesh frame may be signaled in a way that combination of prediction and direct signaling may be allowed. The syntax may be structured to indicate if a sampling rate will be predicted or directly signaled. When predicted, which of the predictor-sampling rate to be used may be further signaled. When directly signaled, the syntax to represent the value of the rate may be signaled.

Figure 4:
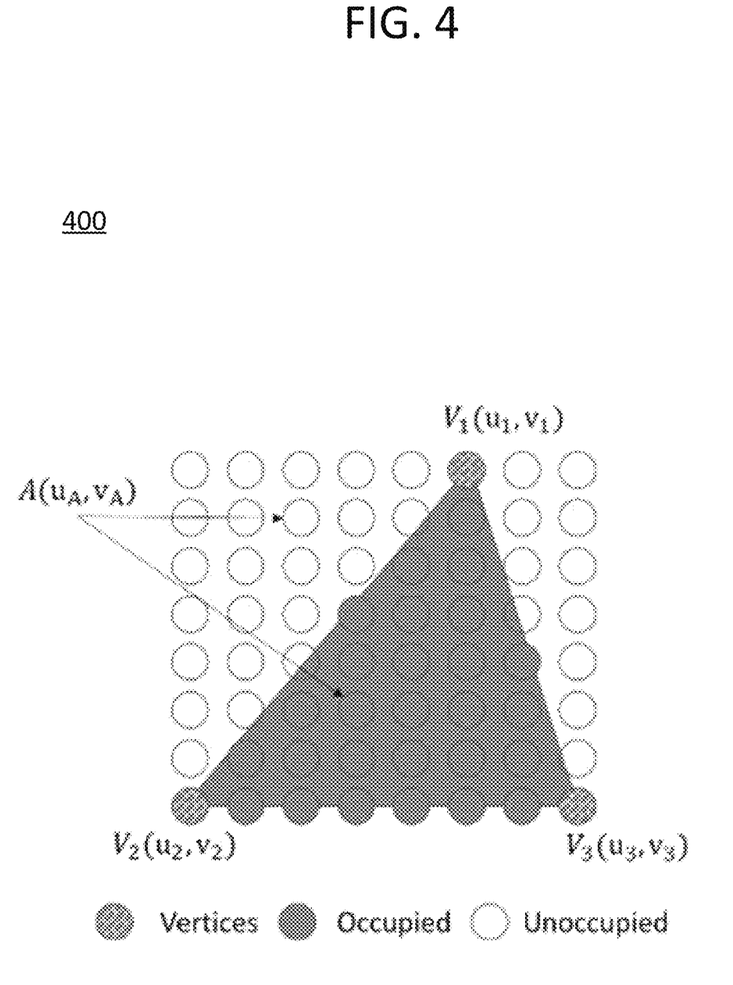
FIG. 4 is an exemplary illustration of 2D atlas sampling of meshes, in accordance with embodiments of the present disclosure.

FIG. 4 is an exemplary illustration of 2D atlas sampling of a triangle mesh 400, in accordance with embodiments of the present disclosure.

As seen in FIG. 4, the triangle mesh 400 may have a plurality of positions and vertices, wherein each integer pixel is merely represented as a circle. Other forms of representations may be used.

Let $V_1, V_2, \ldots, V_D$ denote the vertices of a polygon on a mesh, where D defines the shape of each polygon. For triangle meshes, D equals to 3, i.e., each triangle has 3 vertices. Without losing generality, we assume the meshes are composed of triangle meshes for the rest of the disclosure, i.e., D=3.

For each vertex $V_i$, its UV coordinates are denoted as $(u_i, v_i)$, its 3D position is denoted as $(x_i, y_i, z_i)$, and its other attributes (such as colors and normal) can be denoted as $a_1$. The UV coordinates of vertices, i.e., $(u_i, v_i)$, may be on integer or fractional positions. The 2D UV atlas map of the input mesh may be of the size of W×H and A may be a sample point on the 2D UV atlas map with coordinate $(u_A, v_A)$. If A is inside a triangle of the mesh defined by the UV coordinates $(u_i, v_i)$ of its 3 vertices $V_1, V_2, V_3$, then it can be marked as occupied; otherwise, it can be marked as unoccupied.

According to an aspect of the present disclosure, occupancy maps may be generated based on sampling the 2D UV atlas maps (sometimes meshes). The connectivity of the points and/or positions on the occupancy maps may be signaled (e.g., using metadata or in SPS, PPS, etc.) or be inferred by the decoder. The orientation of the connectivity (clockwise or counterclockwise) may be either signaled in high-level syntax, such as sequence header, slice header, etc., or fixed (assumed) by encoder and decoder.

In an embodiment, a one-channel binary occupancy map may be generated by scanning all the sampling points on the 2D map. Each point on the one-channel binary occupancy map may indicate whether the sample point is inside of any triangles (shape of the mesh polygon) or not. In an embodiment, one-channel non-binary occupancy maps may be generated. As an example, using other values to indicate whether a sample point belongs to a vertex position or a boundary. Multiple-channel occupancy maps, where different channels can have different indications may also be generated. In some embodiments, occupancy maps with only vertex positions may be generated. The connectivity of these vertices may be either signaled to or inferred by the decoder.

Occupancy maps may be compressed by any appropriate image and video codecs. They may be compressed as single-channel or multiple-channel images, e.g., YUV420, YUV400, YUV444, RGB444, etc. They may also be compressed as binary images or arbitrary bit-depth images, e.g., 1-bit, 2-bit, 8-bit, 12-bit, 16-bit, etc. It can be compressed by lossy or lossless codecs.

According to an aspect of the present disclosure, geometry maps may be generated based on sampling the 2D UV atlas maps (sometimes meshes). Unlike ordinary images with RGB colors, geometry images may store the 3D geometry coordinates of the corresponding sample points in their channels. For each occupied sample point A, its 3D geometry position may be interpolated by the 3 vertices of the triangle ($V_1$, $V_2$, $V_3$). Any appropriate interpolation method may be adopted here. For example, a barycenter-based method may be used to estimate the 3D geometry position of A.

As an example, suppose ($\lambda_1$, $\lambda_2$, $\lambda_3$) are the barycentric coordinates of A with respect to the triangle ($V_1$, $V_2$, $V_3$), then $$(u_A, v_A) = \lambda_1 \cdot (u_1, v_1) + \lambda_2 \cdot (u_2, v_2) + \lambda_3 \cdot (u_3, v_3) \quad \text{Eqn (1)}$$

$$\lambda_1 + \lambda_2 + \lambda_3 + 1. \quad \text{Eqn (2)}$$

For a linear relation between UV coordinates and 3D coordinates, the 3D position of $A_{u,v}$, i.e., ($x_A$, $y_A$, $z_A$), may be calculated as follows:

$$(x_A, y_A, z_A) = \lambda_1 \cdot (x_1, y_1, z_1) + \lambda_2 \cdot (x_2, y_2, z_2) + \lambda_3 \cdot (x_3, y_3, z_3) \quad \text{Eqn (3)}$$

In some embodiments, the estimated 3D geometry positions ($x_A$, $y_A$, $z_A$) may be converted to unsigned integers in order to be coded by image and video codecs.

For unoccupied point A, its 3D geometry positions ($x_A$, $y_A$, $z_A$) can be any arbitrary numbers. In some embodiments, to facilitate the coding efficiency of geometry maps, the 3D geometry positions of unoccupied points may be assigned to be similar to their spatial and temporal neighbors. In some embodiments, the 3D geometry positions of unoccupied points can be assigned with a non-possible value for a geometry position, e.g., (−1, −1, −1), in which case the occupancy maps may not be signaled.

To generate geometry maps associated with the sampled positions, according to an aspect of the present disclosure, a 3-channel geometry map may be generated by scanning all the sampling points on the 2D map where each point on the 3-channel geometry map indicates its 3D geometry positions. As an example, the first channel may indicate the x positions, the second channel may indicate the y positions, and the third channel may indicate the z positions. In some embodiments, 3 single-channel geometry maps where each map indicates 3D geometry positions of one axis may be generated. As an example, the first map may indicate the x positions, the second map may indicate the y positions, and the third map may indicate the z positions. In some embodiments, a single-channel geometry map that indicates the depth (distance) to a projection plane may be generated. The projection plane may be different for different triangles, in which case the projection plane information may be signaled as side-information.

According to an aspect of the present disclosure, attribute maps may be generated based on sampling the 2D UV atlas maps (sometimes meshes).

Each occupied sample point A may have attributes, and its attributes (e.g., normal, colors) may be interpolated by the 3 vertices of the triangle ($V_1$, $V_2$, $V_3$). Any appropriate interpolation method may be adopted.

As an example, suppose ($\lambda_1$, $\lambda_2$, $\lambda_3$) are the barycentric coordinates of A with respect to the triangle ($V_1$, $V_2$, $V_3$), then $$(u_A, v_A) = \lambda_1 \cdot (u_1, v_1) + \lambda_2 \cdot (u_2, v_2) + \lambda_3 \cdot (u_3, v_3) \quad \text{Eqn (1)}$$

$$\lambda_1 + \lambda_2 + \lambda_3 + 1. \quad \text{Eqn (2)}$$

The attribute values of $A_{u,v}$, i.e., $a_A$, can be calculated as follows:

$$a_A = \lambda_1 \cdot a_1 + \lambda_2 \cdot a_2 + \lambda_3 \cdot a_3 \quad \text{Eqn (4)}$$

In some embodiments, for each unoccupied point A, its attribute $a_A$ may be arbitrary numbers. In some embodiments, to facilitate the coding efficiency of attribute maps, the attribute values of unoccupied points may be assigned to be similar to their spatial and temporal neighbors. In some embodiments, the attribute values of unoccupied points can be assigned with a non-possible value for an attribute, e.g., (−1, −1, −1), in which case the occupancy maps may not be signaled.

To generate attribute maps associated with the sampled positions, according to an aspect of the present disclosure, a N-channel attribute map where each point on the map indicates its attribute values may be generated by scanning all the sampling points on the 2D map. As an example, for attributes that are colors, the first channel may indicate the R colors, the second channel may indicate the G colors, and the third channel may indicate the B colors. In embodiments where the attributes are normals, the 3 channels can be normal values on x, y, and z axes. In some embodiments, N single-channel attribute maps where each map indicates an attribute value may be generated. As an example, for attributes that are colors, the first map may indicate the R colors, the second map may indicate the G colors, and the third map may indicate the B colors. In some embodiments, the texture maps associated with the mesh may be viewed as additional attribute maps and coded by any appropriate image or video codecs.

Figure 5:
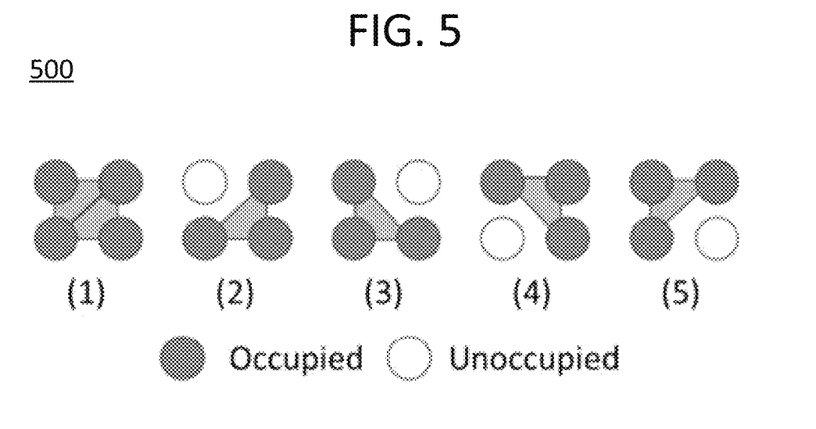
FIG. 5 is an exemplary illustration of connectivity in meshes, in accordance with embodiments of the present disclosure.

FIG. 5 illustrates examples of connectivity in meshes that may be used to generate connectivity information by an encoder and reconstructing meshes by a decoder, in accordance with embodiments of the present disclosure.

A decoder may reconstruct the mesh after decoding the occupancy, geometry and attribute maps. For each occupied point on the occupancy map, the decoder may recover a vertex on the mesh, and the corresponding geometry and attribute values of the point may be obtained from the corresponding positions in the decoded geometry and attribute maps. The connectivity information among vertices may be recovered by the decoder by either implicitly inferring from occupied positions or explicitly signaling.

According to an aspect of the present disclosure, the connectivity information associated with the input mesh and/or 2D UV atlas may be implicitly inferred from the occupancy status of neighboring points on decoded occupancy maps by certain rules. The orientation of the connectivity (clockwise or counterclockwise) may be parsed from high-level syntax, such as sequence header, slice header, etc., or fixed (assumed) by encoder and decoder. According to some embodiments, the reconstructed mesh may have different connectivity from the input mesh. As an example, the input mesh may be a triangle mesh, while the reconstructed mesh may be a quad mesh.

According to an aspect of the present disclosure, for every 4 neighboring points on the decoded occupancy map, if the number of occupied points is larger than or equal to 3, the connectivity of triangles among the 4 points can be inferred by certain rules. As an example, referring to FIG. 5, if 3 out of 4 points are occupied, they can be connected directly to form a triangle as in FIG. 5 examples (2)-(5). As an example, if 4 points are all occupied, they can form two triangles as in FIG. 5 example (1). In some embodiments, different rules may be applied to different number of neighboring points.

In some embodiments, a quad mesh may be reconstructed, when the 4 neighboring points are all occupied. In some embodiments, the reconstructed mesh may be a hybrid type mesh, e.g., some regions in the mesh frame generate triangle meshes while other regions generate quad meshes. The connectivity type can be signaled in high-level syntax, such as sequence header, slice header.

In some embodiments, connectivity information may also be reconstructed by explicitly signaling. If a polygon cannot be recovered by implicit rules, the encoder may signal the connectivity information in the bitstream (e.g., as metadata). Any appropriate means to reduce the overhead of the explicit signaling, such as depending on the boundaries of polygons may be used.

Figure 6:
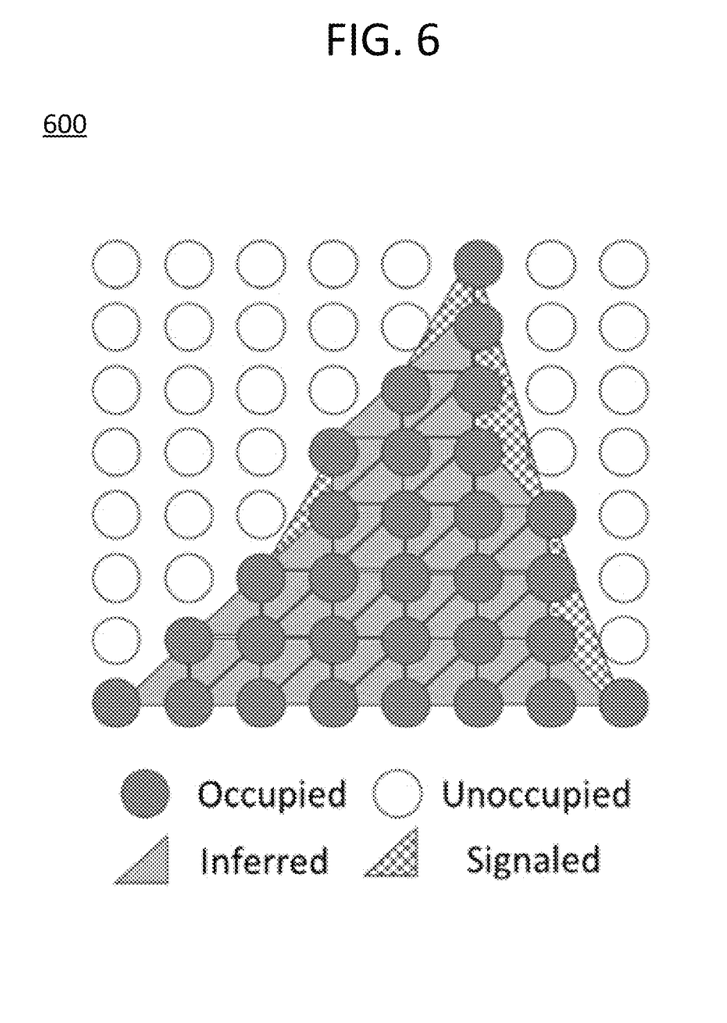
FIG. 6 is an exemplary illustration of a reconstructed mesh, in accordance with embodiments of the present disclosure.

FIG. 6 is an exemplary illustration of a reconstructed mesh 600 generated using a combination of the implicit rules described in FIG. 5, and explicit signaling.

Figure 7:
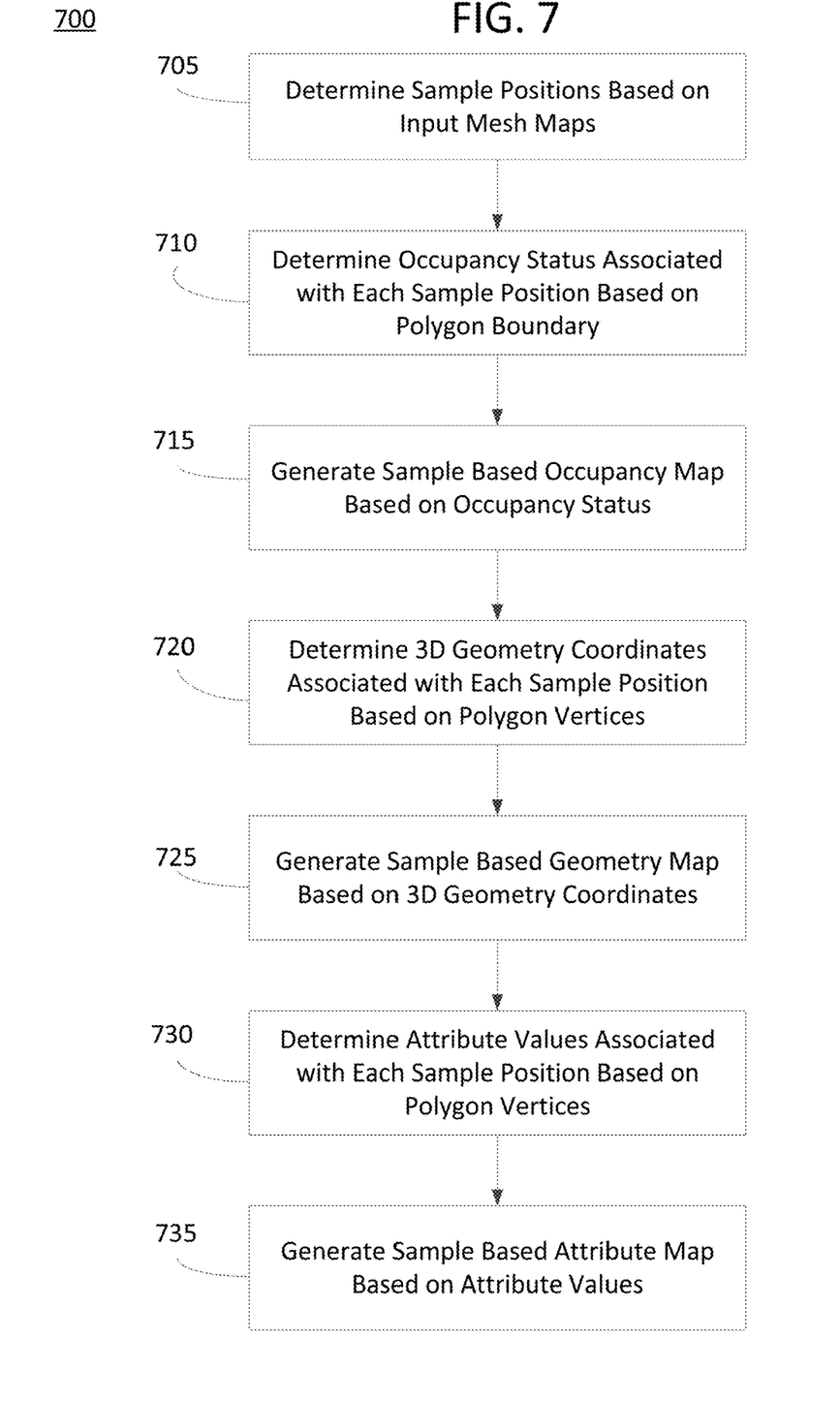
FIG. 7 is a flow diagram illustrating mesh compression using sampling, in accordance with embodiments of the present disclosure.

FIG. 7 is a flow diagram illustrating a process 700 for encoding mesh 2D UV atlas using sampling, in accordance with embodiments of the present disclosure.

At operation 705, one or more sample positions associated with an input mesh may be determined based on one or more sampling rate. As an example, encoder 301 may determine one or more sample positions associated with an input mesh 305 based on one or more sampling rate. In some embodiments, the encoder 301 may determine one or more sample positions associated with a processed mesh with UV atlas 310 based on one or more sampling rate.

In some embodiments, the one or more sampling rate may be based on a first sampling rate for a first axis and a second sampling rate for a second axis. In some embodiments, the one or more sampling rate may be signaled in a high-level syntax. In some embodiments, the one or more respective sampling rate for each of the one or more regions may be based on a respective characteristic of the one or more regions. The respective characteristic may include a texture of a region, an activity of the region, and a smoothness of the region. In some embodiments, the input mesh and/or the processed mesh may be divided into one or more regions, and the one or more sampling rate may be based on one or more respective sampling rate for each of the one or more regions. In some embodiments, the one or more sampling rate may be based on a sampling rate of a neighboring region. In some embodiments, the one or more sampling rate may be based on a previous one or more sampling rate of one or more already coded mesh frames.

At operation 710, an occupancy status associated respectively with each of the one or more sample positions may be determined. The occupancy status may indicate whether each of the one or more sample positions are within boundaries of one or more polygons defined by the input mesh and/or the processed mesh. Based on the occupancy status associated respectively with each of the one or more sample positions, at operation 715, a sample-based occupancy map may be generated. As an example, encoder 301 may generate a sample-based occupancy map (e.g., occupancy maps 315) based on the occupancy status associated respectively with each of the one or more sample positions from operation 305.

At operation 720, 3D geometry coordinates associated respectively with each of the one or more sample positions are determined based on vertices of the one or more polygons defined by the input mesh. In some embodiments, the processed mesh may be used. Based on the 3D geometry coordinates associated respectively with each of the one or more sample positions, a sample-based geometry map may be generated at operation 725. As an example, encoder 301 may determine 3D geometry coordinates associated respectively with each of the one or more sample positions based on vertices of the one or more polygons defined by the input mesh 305 and/or the processed mesh (e.g., mesh with UV atlas 310). The encoder 301 may then generate the sample-based geometry map (e.g., geometry maps 320) based on the 3D geometry coordinates associated respectively with each of the one or more sample positions. In some embodiments, the sample-based geometry map may include three single-channel geometry maps, wherein a first map of the three single-channel geometry maps may indicate x-axis positions associated with each of the one or more sample positions, a second map of the three single-channel geometry maps may indicate y-axis positions associated with each of the one or more sample positions, and a third map of the three single-channel geometry maps may indicate z-axis positions associated with each of the one or more sample positions.

At operation 730, attribute values associated respectively with each of the one or more sample positions may be determined based on vertices of the one or more polygons defined by the input mesh. The attribute values associated respectively with each of the one or more sample positions may then be used to generate a sample-based attribute map at operation 335. As an example, the encoder 301 may determine attribute values associated respectively with each of the one or more sample positions based on vertices of the one or more polygons defined by the input mesh 305 and/or processed mesh (e.g., mesh with UV atlas 315). The encoder 301 may then generate the sample-based attribute map (e.g., attribute maps 325) based on the attribute values associated respectively with each of the one or more sample positions. In some embodiments, the sample-based attribute map may be one of an n-channel attribute map or n single-channel attribute maps.

In some embodiments, the encoder 301 may also generate and/or transmit generated connectivity information (e.g., in the form of metadata 330) associated respectively with each of the one or more sample positions based on the occupancy status associated with one or more neighboring sample positions.

Figure 8:
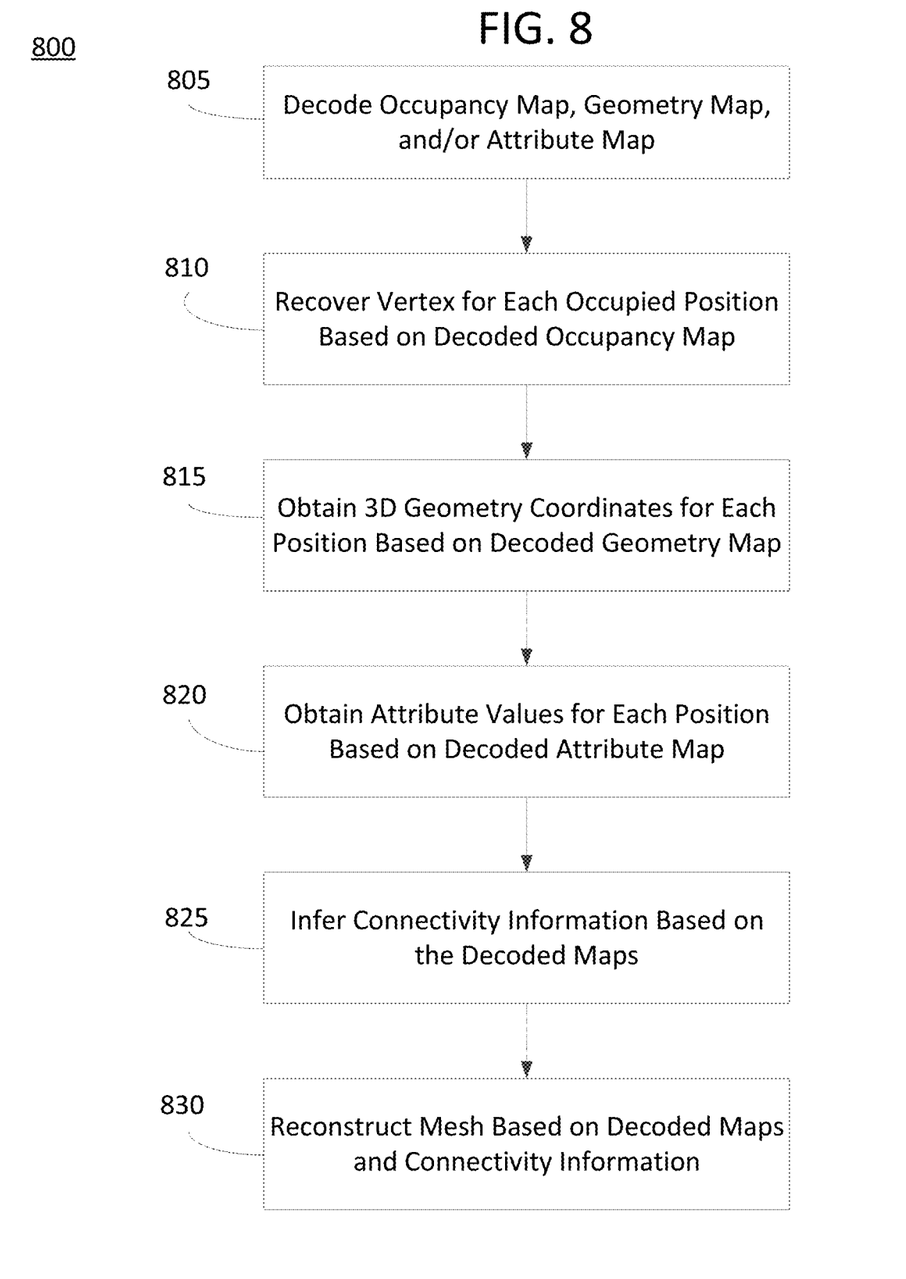
FIG. 8 is a flow diagram illustrating mesh reconstruction, in accordance with embodiments of the present disclosure.

FIG. 8 is a flow diagram illustrating mesh reconstruction, in accordance with embodiments of the present disclosure.

At operation 805, the received occupancy map, attribute map, and geometry map may be decoded. As an example, the decoder 351 may decode the encoded occupancy maps 315, geometry maps 320, and attribute maps 325 to generate decoded occupancy maps 335, decoded geometry maps 340, and decoded attribute maps 345.

At operation 810, a respective vertex associated with each occupied position in the decoded occupancy map may be recovered. As an example, decoder 351 may recover respective vertices associated with each occupied position and/or pixel based on the decoded occupancy maps 335.

At operation 815, 3D geometry coordinates associated with each occupied position may be obtained based on the decoded occupancy map and decoded geometry map. As an example, decoder 351 may obtain 3D geometry coordinates associated with each occupied position based on the decoded occupancy maps 335 and decoded geometry maps 340.

At operation 820, attribute values associated with each occupied position may be obtained based on the decoded occupancy map and decoded attribute map. As an example, decoder 351 may obtain attribute values associated with each occupied position based on the decoded occupancy maps 335 and decoded attribute maps 345.

At operation 825, connectivity information may be inferred based on the decoded maps or may be inferred from explicit signaling. As an example, decoder 351 may infer connectivity information based on the decoded occupancy maps 335, decoded geometry maps 340, decoded attribute maps 345, and metadata 350.

In some embodiments, the connectivity information associated with the input mesh and/or 2D UV atlas may be implicitly inferred from the occupancy status of neighboring points on decoded occupancy maps by certain rules (e.g., FIG. 5 (1)-(5)). The orientation of the connectivity (clockwise or counterclockwise) may be parsed from high-level syntax, such as sequence header, slice header, etc., or fixed (assumed) by encoder and decoder. In some embodiments, the reconstructed mesh may be a hybrid type mesh, e.g., some regions in the mesh frame generate triangle meshes while other regions generate quad meshes. The connectivity type can be signaled in high-level syntax, such as sequence header, slice header.

In some embodiments, connectivity information may also be reconstructed by explicit signaling. If a polygon cannot be recovered by implicit rules, the encoder may signal the connectivity information in the bitstream (e.g., as metadata). Any appropriate means to reduce the overhead of the explicit signaling, such as depending on the boundaries of polygons may be used.

At operation 830, a mesh may be reconstructed based on the decoded maps and connectivity information. As an example, the decoder 351 may generate reconstructed mesh 360 based on decoded occupancy maps 335, decoded geometry maps 340, decoded attribute maps 345, and metadata 350. The decoder 351 may use appropriate reconstruction filters and/or post-processing techniques to generate the reconstructed mesh 360. According to some embodiments, the reconstructed mesh may have different connectivity from the input mesh. As an example, the input mesh may be a triangle mesh, while the reconstructed mesh may be a quad mesh.

The techniques, described above, can be implemented as computer software using computer-readable instructions and physically stored in one or more computer-readable media. For example, FIG. 9 shows a computer system 900 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
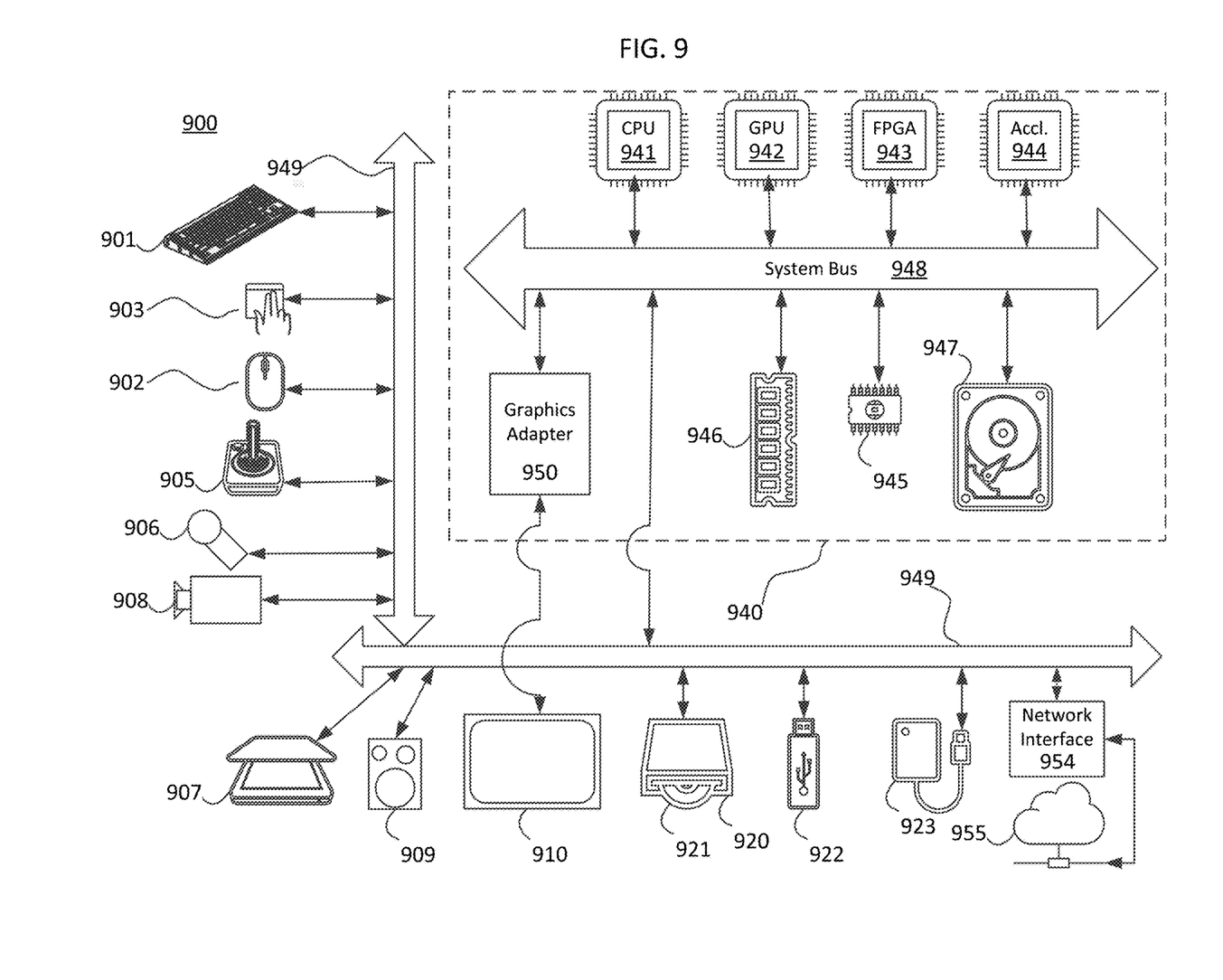
FIG. 9 is a diagram of a computer system suitable for implementing embodiments.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for sampling-based dynamic mesh compression, the method being executed by at least one processor, the method comprising:
   determining one or more sample positions associated with an input mesh based on one or more sampling rate;
   determining whether each of the one or more sample positions are within boundaries of one or more polygons that make up the input mesh;
   determining an occupancy status associated respectively with each of the one or more sample positions based on determining that each of the one or more sample positions are within boundaries of one or more polygons that make up the input mesh;
   generating a sample-based occupancy map based on the occupancy status associated respectively with each of the one or more sample positions; and
   compressing the sample-based occupancy map using a video codec into a plurality of single-channel or multiple-channel images.

2. The method of claim 1, wherein the one or more sampling rate is based on a first sampling rate for a first axis and a second sampling rate for a second axis.

3. The method of claim 1, wherein the input mesh is divided into one or more regions, and wherein the one or more sampling rate is based on one or more respective sampling rate for each of the one or more regions.

4. The method of claim 1, wherein the one or more sampling rate is signaled in a high-level syntax.

5. The method of claim 3, wherein the one or more respective sampling rate for each of the one or more regions is based on a respective characteristic of the one or more regions.

6. The method of claim 5, wherein the respective characteristic is at least one of:
a texture of a region;
an activity of the region; and
a smoothness of the region.

7. The method of claim 1, wherein the one or more sampling rate is be based on a sampling rate of a neighboring region.

8. The method of claim 1, wherein the one or more sampling rate is based on a previous one or more sampling rate of one or more already coded mesh frames.

9. The method of claim 1, wherein the method further comprises:
determining 3D geometry coordinates associated respectively with each of the one or more sample positions based on vertices of the one or more polygons defined by the input mesh; and
generating a sample-based geometry map based on the 3D geometry coordinates associated respectively with each of the one or more sample positions.

10. The method of claim 9, wherein the sample-based geometry map comprises three single-channel geometry maps, and wherein a first map of the three single-channel geometry maps indicates x-axis positions associated with each of the one or more sample positions, a second map of the three single-channel geometry maps indicates y-axis positions associated with each of the one or more sample positions, and a third map of the three single-channel geometry maps indicates z-axis positions associated with each of the one or more sample positions.

11. The method of claim 1, wherein the method further comprises:
determining attribute values associated respectively with each of the one or more sample positions based on vertices of the one or more polygons defined by the input mesh; and
generating a sample-based attribute map based on the attribute values associated respectively with each of the one or more sample positions.

12. The method of claim 11, wherein the sample-based attribute map is one of an n-channel attribute map or n single-channel attribute maps.

13. The method of claim 1, wherein the method further comprises:
generating connectivity information associated respectively with each of the one or more sample positions based on the occupancy status associated with one or more neighboring sample positions.

14. A device for sampling-based dynamic mesh compression, the device comprising:
at least one memory configured to store program code; and
at least one processor configured to read the program code and operate as instructed by the program code, the program code including:
first determining code configured to cause the at least one processor to determine one or more sample positions associated with an input mesh based on one or more sampling rate;
second determining code configured to cause the at least one processor to determine whether each of the one or more sample positions are within boundaries of one or ore polygons that make up the input mesh;
third determining code configured to cause the at least one processor to determine an occupancy status associated respectively with each of the one or more sample positions based on determining that each of the one or more sample positions are within boundaries of one or more polygons that make up the input mesh;
first generating code configured to cause the at least one processor to generate a sample-based occupancy map based on the occupancy status associated respectively with each of the one or more sample positions; and
compression code configured to cause the at least one processor to compress the sample-based occupancy map using a video codec into a plurality of single-channel or multiple-channel images.

15. The device of claim 14, wherein the program code further comprises:
third determining code configured to cause the at least one processor to determine 3D geometry coordinates associated respectively with each of the one or more sample positions based on vertices of the one or more polygons defined by the input mesh; and
second generating code configured to cause the at least one processor to generate a sample-based geometry map based on the 3D geometry coordinates associated respectively with each of the one or more sample positions.

16. The device of claim 14, wherein the program code further comprises:
forth determining code configured to cause the at least one processor to determine attribute values associated respectively with each of the one or more sample positions based on vertices of the one or more polygons defined by the input mesh; and
third generating code configured to cause the at least one processor to generate a sample-based attribute map based on the attribute values associated respectively with each of the one or more sample positions.

17. The device of claim 14, wherein the program code further comprises:
forth generating code configured to cause the at least one processor to generate connectivity information associated respectively with each of the one or more sample positions based on the occupancy status associated with one or more neighboring sample positions.

18. The device of claim 14, wherein the input mesh is divided into one or more regions, and wherein the one or more sampling rate is based on one or more respective sampling rate for each of the one or more regions.

19. The device of claim 18, wherein the one or more respective sampling rate for each of the one or more regions is based on a respective characteristic of the one or more regions.

20. A non-transitory computer-readable medium storing instructions, the instructions comprising: one or more instructions that, when executed by one or more processors of a device for sampling-based dynamic mesh compression, cause the one or more processors to:
determine one or more sample positions associated with an input mesh based on one or more sampling rate;
determine whether each of the one or more sample positions are within boundaries of one or more polygons that make up the input mesh;
determine an occupancy status associated respectively with each of the one or more sample positions based on determining that each of the one or more sample positions are within boundaries of one or more polygons that make up the input mesh;

generate a sample-based occupancy map based on the occupancy status associated respectively with each of the one or more sample positions; and compress the sample-based occupancy map using a video codec into a plurality of single-channel or multiple-channel images.

* * * * *